| United States Patent [19] | [11] Patent Number: 4,976,933 |
| --- | --- |
| Mungall et al. | [45] Date of Patent: Dec. 11, 1990 |

[54] HYDROGEN STREAM PURIFICATION

[75] Inventors: Thomas G. Mungall; William E. Moehle, both of Baton Rouge, La.

[73] Assignee: Ethyl Corporation, Richmond, Va.

[21] Appl. No.: 72,421

[22] Filed: Jul. 13, 1987

[51] Int. Cl.$^5$ .......................... C01B 33/04; C01B 3/00
[52] U.S. Cl. .................... 423/210; 423/248; 423/347; 502/344
[58] Field of Search .................. 423/248, 347, 210; 502/344

[56] References Cited

U.S. PATENT DOCUMENTS

| | | | |
| --- | --- | --- | --- |
| 4,292,344 | 9/1981 | McHale | 427/45.1 |
| 4,535,072 | 8/1985 | Kitayama et al. | 502/412 |
| 4,565,677 | 1/1986 | Yusa | 423/347 |
| 4,612,174 | 9/1986 | Fabian et al. | 423/224 |

OTHER PUBLICATIONS

Gmelin, 8th Ed., Silicon Supplement, vol. B1, System No. 15, pp. 143-144.
Barrier, R. M., et al, ACS Symposium, Ser. No. 40 (1977) pp. 258-270.
Eversteijn, *Philips Res. Repts.* 26, 134-144 (1971).
Hsu et al, *J. Electrochem Soc.: Solid State Science and Technology*, vol. 131, No. 3, pp. 660-663 (Mar., 1984).
Hsu et al, *Eighteenth IEEE Photovoltaic Specialists Conference* (1984), pp. 553-557.

*Primary Examiner*—John Doll
*Assistant Examiner*—Lori F. Cuomo
*Attorney, Agent, or Firm*—Philip M. Pippenger

[57] ABSTRACT

Silane can be adsorbed by KOH on alumina. This discovery can be used to remove silane from other gases, e.g. hydrogen.

2 Claims, No Drawings

HYDROGEN STREAM PURIFICATION

FIELD OF THE INVENTION

This invention relates to gas purification. More particularly, in a preferred embodiment it relates to removal of silane from a hydrogen recycle stream used in polysilicon manufacture.

BACKGROUND OF THE INVENTION

It is known that silane reacts with aqueous alkaline systems; Gmelin, 8th Edition, Silicon Supplement, Volume B1, System Number 15, pages 143–144. Silane also reacts with mordenite; Barrier, R. M., et al, ACS Symposium, Serial No. 40 (1977), pages 258–270.

Silane is used in making polycrystalline silicon; confer McHale, U.S. Pat. No. 4,292,344; Eversteijn, *Philips Res. Repts.* 26, 134–144, (1971); Hsu et al, *J. Electrochem Soc.: Solid State Science and Technology,* Vol. 131, No. 3, pp. 660–663, (March, 1984); Hsu et al, *Eighteenth IEEE Photovoltaic Specialists Conference* (1984), pp. 553–557.

SUMMARY OF THE INVENTION

When silane is thermally decomposed to prepare polysilicon in a chemical vapor deposition process, it is frequently introduced into the reactor admixed with hydrogen. Use of silane in relatively low concentrations in hydrogen suppresses the formation of unwanted silicon dust or fines. Fines are produced through silane homogeneous decomposition.

Moreover, use of relatively low concentrations of silicon in hydrogen promoted the formation of desired polysilicon product. Silicon metal product is produced via a second reaction mechanism known as heterogeneous deposition. In fluidized bed processes, the concentration of silane in the deposition gas is typically 5–20 mole %.

When silane decomposes, hydrogen is a by-product, as illustrated by the following equation:

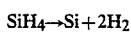

$$SiH_4 \rightarrow Si + 2H_2$$

The hydrogen by-product is an attractive source for hydrogen used as a silane carrier gas introduced into the reactor. However, before the hydrogen by-product can be recycled for such use, it is preferably treated to remove impurities contained therein. The impurities include silicon fines, which can be removed by filtration, and silane.

Although silane may be admixed with hydrogen prior to recycle to the fluidized bed reactor, the hydrogen is preferably rendered essentially silane free before the mixing step. This requirement is imposed by a preheating step used prior to mixing. More specifically, before the recycled hydrogen and silane are admixed for introduction into the fluidized bed reactor, the hydrogen is preferably preheated to a temperature of 300°–400° C. by passage through a heating zone. Preheating the hydrogen enhances operation of the fluidized bed. In the preheating step, hydrogen at or near the wall of the conduit—that is used to conduct the hydrogen through the heating zone—becomes heated to a temperature higher than the decomposition of silane. Therefore, silane present near the conduit wall can decompose, and deposit silicon metal where undesirable pluggage will occur. Accordingly, silane is preferably removed from recycle hydrogen before the preheating step takes place.

Furthermore, the process for the preparation of silicon from silane is a net producer of hydrogen. The hydrogen generated, above that required in the process, can be used in known ways unrelated to this invention. In many instances, the silane level needs to be reduced in order to make the hydrogen suitable for such other uses.

DESCRIPTION OF PREFERRED EMBODIMENTS

This invention relates to a process for removing silane admixed with a gas, said process comprising adsorbing said silane on a bed of KOH on an alumina support, said process being conducted at a mildly elevated temperature.

This invention is preferably employed with (1) a fluidized bed polysilicon process in which (2) an appreciable quantity of silane is present in the hydrogen-containing gas that is discharged from the reactor. A fluidized bed process for preparing silicon metal from silane can be conducted such that all of the silane is not reacted. This expedient is attractive since the productivity of the polysilicon process can be increased if less than all of the silane is converted. In a preferred process 10–25% of the silane introduced into the fluidized bed, is not reacted. In the preferred process, the silane content in hydrogen admitted to the reactor is preferably within the range of 10–15 mole %. Thus unreacted silane in the effluent gas exiting the reactor can be from about 1.0 to about 3.75 mole %.

Effluent gases having concentrations of silane in this range are efficaciously treated by the process of this invention. However, hydrogen containing greater or lesser amounts of silane, e.g. from about 0.2 to about 10 mole percent, can be used in the process of this invention.

A skilled practitioner will recognize that the process of this invention is not dependent upon treatment of hydrogen which contains a quantity of silane in the aforementioned range. Hydrogen with greater or lesser concentrations of silane can be treated. Skilled practitioners will recognize there is no real lower limit on the amount of hydrogen. As long as the silane content of the hydrogen emerging from the adsorption zone used in this invention is less than the silane content in the hydrogen admitted to the zone, the process of this invention can be employed. Likewise, there is no real upper limit on silane content. When the silane content is high one may use more adsorbent to reduce the silane level to the desired extent.

A skilled practitioner will also recognize that although this invention is particularly suited for use with hydrogen generated by a chemical vapor deposition process for producing silicon from silane, the invention is not limited to treatment of silane-containing hydrogen produced by such a process. Rather, this invention can be used to remove silane from any mixtures of hydrogen and silane without any limitation relating to how the mixture was made. In other words, this invention is independent of the method of formation of the hydrogen-silane mixture employed.

In a reactor, silane can thermally decompose by two major pathways. The first of these, (heterogeneous deposition) is the mechanism by which desired silicon metal is produced. Homogeneous decomposition produces unwanted silicon dust or fines. In commercial operations where productivity is a significant factor, it may not be feasible to completely avoid production of all fines of dust. Thus, dust or fines can be entrained in silane-containing hydrogen effluent exiting a silane reactor. Silicon dust or fines varies in size from submicron material, to particles having a diameter up to about 10 microns. These particles can be recovered from the silane-hydrogen mixture by methods known in the art for removing solid particles of this size range, from a stream of gas.

After removal of the fines or dust, the silane-hydrogen mixture is contacted with the adsorbent at a suitable reaction temperature. The temperature selected is not critical. A preferred reaction temperature provides a reasonable reaction rate without an undesirable amount of extraneous side effects. A moderately elevated temperature is used. Usually the temperature is within the range of from about 50° to about 250° C.; more preferably 50°-150° C. The process proceeds well at atmospheric pressure. A pressure above or below atmospheric pressure can also be used. Generally speaking, pressures within the range of 0.1-10 atmospheres can be used, with pressures above one atmosphere being preferred. The reaction time is not a truly independent variable but depends at least to some extent on the other reaction conditions employed, e.g. temperature. As shown below, the reaction can be conducted in a static system over-night e.g. about 16-20 hours. When a flow of gas is contacted with the adsorbent, the contact time can be 0.5 to 5 minutes or more, or less.

Adequate alkali metal hydroxide/alumina adsorbent to remove the desired amount of silane is employed in this invention. The activated alumina adsorbent can be within a multiplicity of containers within the adsorption zone. More specifically, it is not necessary to keep the activated alumina adsorbent in one vessel. It can be in a plurality of vessels, e.g. 3 or 5, or more, arranged in sequence, each vessel having gas inlet and outlet means. Alternatively containers of adsorbent can be arranged in parallel with one, two or more vessels in each parallel train. When a parallel arrangement is used, a suitable manifold is employed to distribute the flow of silane/hydrogen mixtures to the adsorption vessels that are arranged in parallel.

When a manifold is used to distribute hydrogen/silane mixtures alternatively down less than all parallel paths, this facilitates continuous operation. One path can be used while the other is being reconditioned. After it is reconditioned, it can be used to adsorb silane, while maintenance is performed the other parallel system.

The process of this invention is conducted by contacting hydrogen or other gas that contains silane with an alkali metal hydroxide dispersed on a support with some alkaline character or electron donor properties such as alumina. The amount of metal hydroxide dispersed on the support can be any convenient amount that readily adsorbs silane. The preferred alkali metal hydroxide is potassium hydroxide. Sodium hydroxide can also be used.

Activated aluminas of commerce are suitable for this invention. These materials are made from hydrated aluminas by thermal treatment to remove water. Generally speaking, for the purposes of this invention, the amount of metal hydroxide dispersed on activated alumina can be in the range of about 5-25 weight percent, preferably 5-15 weight percent. Preparations of KOH on alumina sold in commerce for use in vapor phase chromatographic columns has been found suitable for this invention.

The process of this invention is conducted in the absence of added water It proceeds well under anhydrous or substantially anhydrous conditions. The solid materials can be treated to remove water, e.g. using a nitrogen stream at 150° C. followed by evacuation at normal vacuum pump pressures at 125° C.

The process of this invention is conducted by contacting a silane containing gas with the adsorbent at reaction temperatures. The process can be conducted in static systems in which a batch of gas to be treated is admitted to a zone containing the silane adsorbent, and the gas and adsorbent are left in contact until silane is adsorbed. Alternatively, the process can be conducted using a dynamic system, i.e. flowing a stream of gas to be treated through a vessel, e.g. an elongated tube containing the silane adsorbent.

EXAMPLE

The following table summarizes experiments comparing the adsorption of silane on various substances. A static system was employed with no circulator to remove the hydrogen from the sample.

As shown, the experiments were conducted by admitting silane to a closed system containing a weighed amount of adsorbent to be tested. A portion of the silane interacted with the adsorbent, forming chemi-adsorbed silane, and hydrogen as a by-product. The system was allowed to equilibrate at the temperature given in the table, for the time indicated. The amount of by-product hydrogen produced, and the amount of silane remaining in the gas after the equilibration were determined. The amount of silane reacted wa s calculated by difference. To determine the amount of hydrogen after equilibration, the silane was removed from the gaseous mixture by condensation using liquid nitrogen temperatures. After condensing the silane, the amount of hydrogen present was determined using the relationship defined by the following equation.

$$n = \frac{PV}{RT}$$

The condensation caused a reduction in pressure. Since the initial pressure, silane added, and the amount of hydrogen formed were known, the amount of silane reacted could be calculated.

As shown, solid NaOH showed little tendency to react with silane at 100° C. This may be due to the lack of ability of the silane to penetrate into the interior of the solid particles. The solution of sodium hydroxide reacted well as did the KOH dispersed on alumina. The 1% KOH on glass beads was only partially active; it might have been too lightly loaded with hydroxyl groups to work effectively. The results indicated that more than one hydroxyl group in the adsorbent may be needed to chemisorb the silane.

The process of the above example illustrates that silane can be chemically adsorbed on an adsorbent comprising 5-25 wt. % of an alkali metal hydroxide dispersed on activated alumina, wherein the silane content of the gas from 1.0 to about 3.75 mole percent, at a temperature of from about 50° C. to about 150° C. at a pressure of 1-10 atmospheres. The silane may be in a gas such as hydrogen, neon, argon, nitrogen and the like, which is not adsorbed by the adsorbent to an appreciable extent.

TABLE
Silane Reaction with Various Substances

| Sample Description | Sample Temp. (°C.) | Sample Charging Pressure (mm Hg) | Final System Pressure (mm Hg) | mmoles Silane Added | Molar Ratio Hydrogen to Silane | mmoles Silane Final | mmoles Silane Reacted | Sample Weight (Grams) | Time Allowed to Equilibrate Sample |
|---|---|---|---|---|---|---|---|---|---|
| Solid NaOH | 100 | 8.87 | 16.32 | 0.3138 | 3.92 | .2241 | 0.0897 | 4.89 | 2 hrs. |
| Solid NaOH | 100 | 88.64 | 92.09 | 3.120 | 2.87 | 3.039 | 0.0807 | 4.89 | Overnigth |
| Solid NaOH | 100 | 436.91 | 439.80 | 15.505 | 1.26 | 15.409 | 0.0960 | 4.89 | 2 hrs. |
| 1.9% NaOH Solution | 30 | 133.65 | 234.75 | 4.650 | 3.54 | 3.210 | 1.440 | 6.51 | Overnight |
| 1% KOH on Glass Beads | 100 | 133.22 | 134.50 | 4.687 | 1.97 | 4.615 | 0.072 | 12.99 | Overnight |
| 10% KOH on Alumina | 100 | 133.75 | 204.42 | 4.736 | 2.52 | 3.078 | 1.658 | 1.29 | Overnight |

With the above detailed description, a skilled practitioner can make modifications of this invention without departing from the scope or spirit of the claims that follow.

We claim:

1. Process for removing silane admixed with hydrogen, said process comprising adsorbing said silane on a bed of alkali metal hydroxide supported on activated alumina, said process being conducted at a temperature of from about 50° C. to about 150° C., under substantially anhydrous conditions.

2. The process of claim 1 wherein said alkali metal hydroxide is KOH.

* * * * *